INVENTOR.
THOMAS H. JOHNSON

United States Patent Office 3,261,353
Patented July 19, 1966

3,261,353
VAGINAL DEVICES
Thomas H. Johnson, 111 E. 71st St.,
New York, N.Y.
Filed May 13, 1963, Ser. No. 279,784
3 Claims. (Cl. 128—127)

The present invention relates to a vaginal device and it particularly relates to a simple conception control device.

The primary object of the present invention is to provide a vaginal or conception control device which will be applicable by either party and which may be readily used without awkwardness, embarrassment, fear or unfavorable psychic responses on the part of either or both parties.

Another object of the present invention is to provide an effective chemical-physical method of contraception initiable by either party which will not give rise to female or male awareness during its use, and which will readily stay in position, and which will not give any concern as to retrievability at any time at the discretion of the female party.

A further object of the present invention is to provide a simple conception control device in which it will not be necessary to use a diaphragm or cervical caps requiring careful fitting and which excludes any difficulty in application due to wide variation in size and geometry of the vaginal canal and the cervical os respectively, and which will not require the use of intra-uterine abortive-coils or springs and also requiring fitting by the physician.

A still further object of the present invention is to provide a conception control system which also will avoid the use of chemical and/or chemico-mechanical combinations including foams, jellies, creams, diaphragms and pessaries and including male condoms, either containing spermatocidal and/or anti-venereal chemicals, all having serious psychic limitations in their usage.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

This particular invention will be accomplished by a laminated sheet of natural or synthetic rubber foam or other plastic foam. This sheet of foam is laminated or cemented to a lightly cured surgical gum rubber diaphragm having approximately dental dam thickness.

This rubber or other organic foam laminate is desirably saturated by alternate compression and release of spermatocidal chemicals which may also contain anti-venereal agents and lubricants.

Although rubber foam is used it is also possible to utilize polyether, polyester or polyurethane foam in sheet form in which the pores will be intercommunicating with one another.

In certain applications it is desirable to reduce the absorptive capacity around the edges of the laminate by slight application of heat while the full porosity is maintained in the central portions of the laminate.

This chemical treated laminate may then be so heat sealed or treated so that when it is inverted a similar shape will be formed corresponding closely to the male glans.

Desirably, there is heat sealed to the chemically treated laminate a semi-circular extended rubber arm or extension for easy retrievability the presence of which will be undetectable from a sensory perception point of view.

Alternatively there is punched through the flat portion of the foam laminate an elliptical hole of approximately 3/4" length located near the end of the flat surface.

The basic physical material for preparation of the preferred device of the present invention is a resilient gum rubber sheet material 1/32" thick which is non-porous and which is laminated with a porous natural or synthetic rubber latex foam sheet cut to proper size. Desirably the foam sheet is thicker than the gum rubber sheet by 20 to 100% and in the preferred form the foam rubber sheet is at least twice as thick as the base non-porous rubber sheet.

In one form of the invention which is not preferred there may be an impermeable rubber base sheet 1/16 to 1/8" in thickness and preferably 1/32". Then there may be laminated on top of this sheet a highly porous rubber foam or polyurethane sheet 1 1/4 to 2 times the thickness of the base sheet and then over the top may be a less porous sheet of about the same thickness as the basic non-porous rubber sheet.

The sealing or cementing of one edge of the flat surface to the other edge side, with or without batten strip, of lightly vulcanized gum rubber attached only to the gum rubber part of the surface, can be done either before or after treatment with the chemical.

A wide variety of chemicals may be used for chemical treatment primarily for their spermatocidal, lubricant and anti-venereal properties, and they may be enhanced in their effectiveness by the mode of application to the laminated porous material.

Firstly referring to the laminate which consists of a foam rubber material over a gum rubber diaphragm, this is impregnated by alternate compression and release in the spermatocidal bath solution.

This is accomplished by passing the foam rubber material with compression between rollers to provide uniform filling throughout, and the stable solution may be caused to dry in the pores and in the interior of the structure and be reactivated by simple wetting prior to use or by relying upon natural vaginal fluids, or will be maintained in the wetted state by proper packaging.

This foam rubber laminate may serve as a protective reservoir which will always have a ready supply of the material and which is to be subsequently released with improved chemical effectiveness.

The absorption of the protective solution may also be enhanced by a surface application as by painting, spreading, dipping or otherwise applying a water soluble or insoluble lubricant containing the spermatocide to the foam rubber laminate and also if desired to the solid rubber surface which is laminated to the foam rubber laminate.

Although a wide variety of spermatocides may be employed, it has been found most satisfactory to use the following which can be employed either in aqueous solution or in aqueous suspension or dispersion:

(a) Lactic acid, ricinoleic acid, boric acid.
(b) Phenyl mercuric acetate, nonyl phenoxy polyoxy ethylene ethanol (in general substituted polyethylene oxide which has been reacted with alkyl phenols and/or aliphatic alcohols in which there may be from 10–30 ethylene oxide groups and in which the alkyl groups of the phenols and aliphatic alcohols may contain from 1–10 (carbon atoms), sodium lauryl sulfate, potassium lauryl sulfate, di-lauryl sulfate, sodium benzoate, sodium borate.
(c) Hydrolizable solid acetates, such as low molecular weight polyvinyl acetate containing 8 to 30 carbon atoms per molecule, and the normally solid alkyl acetate of the $C_6$ to $C_{18}$ range.

Various combinations of the above classes of constituents will be used to provide the properties of the spermatocide, the detergent and the dispersant respectively.

In addition to the above spermatocidal chemicals, there may be included in these materials anti-venereal materials of the aprototropic type, particularly those which are compatible and/or soluble with the above materials.

Among these materials are:

(d) Antibiotics such as Erythromycin, Bacitracin, Neomycin, Furacin, Neosporin and Polymixin.

(e) In lieu of the antibiotics, the following chemicals may be employed: Di-iodomercury sulfo-phthalein sodium Argentic or mercuric sulfo-phthalein and/or combinations of these, phenyl pyridium bromide and pyridium bromide iodide, polyvinyl pyrrolidone-iodine complex lubricants are also desirably used.

(f) As lubricating materials, it is possible to use synthetic alkyl containing (3 to 18 carbon atoms) esters of adipic, sebacic, and palmitic acids which can readily be used in emulsified form to impregnate the rubber foam from a water system which will not dissolve and extract the previously disposed spermatocides and/or anti-venereal agents.

In lieu of the acids above described it is also possible to utilize other fatty acids having from 12 to 18 carbon atoms.

In the above composition the spermatocides may be used in an amount ranging from 1 to 10% with a preferred concentration of 2 to 6%. Where anti-venereal materials are employed they may be included in amounts ranging from 1 to 8% with a preferred proportion of 2 to 6%. Where lubricants are used they are desirably used in proportions ranging from 1 to 10% with a preferred range of 2 to 6. The balance of the composition will be water or water containing 5 to 10% of glycerine. Small amounts of non-ionic surface active agents may also be employed ranging from 1 to 4% as may also be small quantities of sodium or potassium salts of high molecular weight fatty acids containing 14 to 18 carbon atoms.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
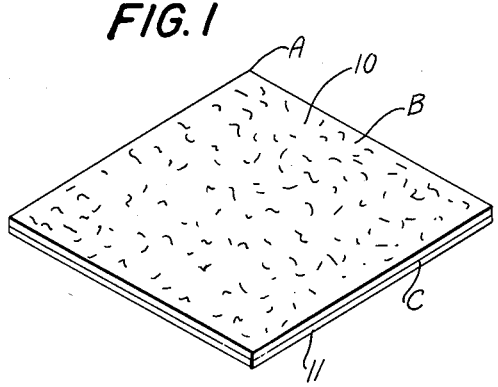
FIG. 1 is a fragmentary side perspective view showing the laminate of the present invention.

Referring to FIG. 1, there is shown a laminate A having an upper layer B of 1/8" latex foam and lower layer C consisting of a 1/32" dental rubber dam.

This laminate may be cut in squares 2" by 2" and forms the basic material from which the device of the present invention may be formed.

In FIG. 1, the permeable face is indicated at 10 and the nonpermeable face is indicated at 11, the permeable face consisting of latex foam and the nonpermeable face consisting of the rubber sheeting or dam material.

Figure 2:
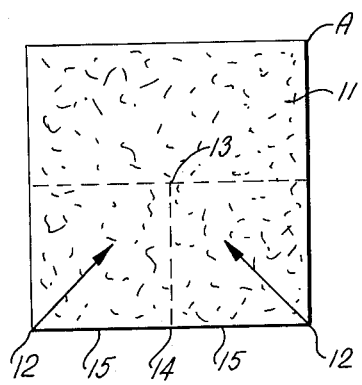
FIG. 2 is a top plan view of the laminate from one side thereof diagrammatically illustrating the manner in which it is folded.

In FIG. 2, there is shown the laminate A with the fold lines being indicated thereon and with the permeable face B being exposed.

In folding the sheet as indicated in plan view FIG. 2, the lower corners 12 are brought to the center point 13 and the borders extending from the center points 12 to the middle point 14 on the edge 15 are slightly overlapped and sealed to each other.

Figure 3:
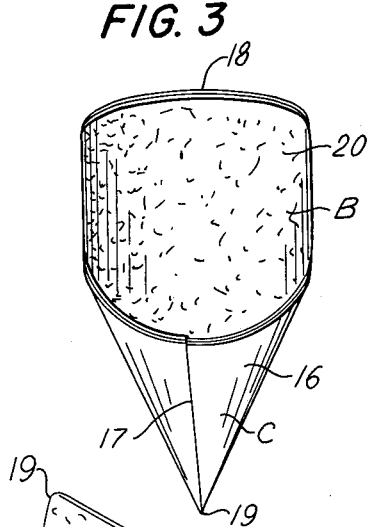
FIG. 3 is a perspective view showing the manner in which the laminate is formed into irregular conical shape.

This will give the conical structure indicated at 16 in FIG. 3 with an overlap at 17 of the edge 15 and with an extension cuff 18.

In the form shown in FIG. 3, the hollow cone will have the foam rubber face B on the inside and the solid rubber sheet C on the outside, and desirably the corner 19 may be cut away to form a pinhole air break at the apex.

Figure 4:
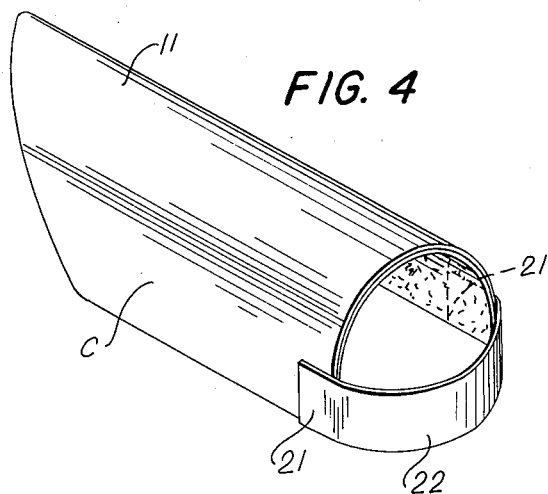
FIG. 4 is a side elevational view showing the device of FIG. 3 with the attachment strip connected thereto.
Figure 5:
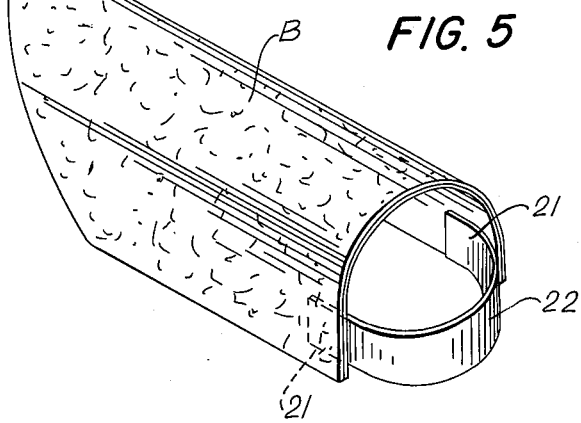
FIG. 5 is a side elevational view showing the device in inverted position.

The side and portion 18 will form an elongated slightly curved semi-cylindrical hood which is best shown in FIGS. 4 and 5.

The extension and portion 18 will serve to cover the cervix when the device has been intravaginal.

The area 20 on each side will receive the ends 21 of the rubber strip 22 which is best shown in FIG. 4. Alternately, the area 20 will be punched in an elliptical form about 3/4" long and 1/4" wide.

The device will always be inserted with the pointed or conical portion first and the edge last. The strap is soft and flexible and does not interfere with the use of the device.

The ends of the rubber strip are desirably laminated or sealed to the rubber dam face or side without affecting the foam rubber absorptive sheet.

Referring to FIG. 5, there is shown the result of reversal or turning inside out of the rubber sheet with the porous or rubber foam face now being on the outside.

It will be noted that the rubber band 22 now has its ends 21 sealed to the inside of the tubular extension, and this rubber band 22 will not be put out of the way and will traverse the vaginal lumen but will not interfere with coition.

By turning the device inside out as indicated in FIG. 5 from the position in FIG. 4, the foam rubber surface becomes the outer lining with the foam rubber face B being in contact with the vaginal wall.

This will produce a more rounded contour to the apex of the cone, and at the same time the impervious rubber face of the dental dam face C will be on the inside and will be in effective position to be compressed and cause extrusion or pressing out of any liquid that might be absorbed by the porous laminate B.

The device as shown in FIGS. 1 to 5 may be readily packaged for instant use and may be readily inserted in the vaginal canal without any prior or special measurements or fittings and without special instruments, only the finger is necessary as an insertion device.

To insert the device, the finger may be inserted in the apex adjacent the point 19, and if desired, the exterior of the cone may be moistened.

At all times the cuff or extension 18 should be up upon the insertion.

By "up" is meant that the hollow portion of the device of FIGS. 3 and 4 extends downwardly toward the feet while the closed curved side extends upwardly toward the head.

By insertion in this manner, the device will retain its desired position, and it will stay in maximal contact with the vaginal wall, and the shape will accept the penile head without significant displacement.

The shape will catch any ejaculate within its interior, and there will be no escape or contact with the vaginal wall.

The device, due to the fact that it is relatively thin and retains its position, will not create any significant sensation when it is in place, and it may be worn for a prolonged period without connection or hazard.

At any time it may be removed by hooking the finger inside of the strap 22, or alternatively may be removed by hooking finger through the punched hole in the cuff at area 20, below the border of extension 18 of the device.

The material which has been impregnated in the foam rubber portion 11 thereof will be always available and will be extruded when needed by action of the organs during coition.

During coition the compression of the laminate will cause the materials impregnated on the cellular structure of the foam latex B to be released and evenly distributed over the critical areas of the vaginal surface, and it will at all times maintain a spermatocidal activity within the vaginal canal.

The same action of coition will cause a simultaneous action of the foam in sponging away sperm protecting buffers from the vaginal wall. The result of this designed action will be the simultaneous deposition of spermatocide to the essential vaginal areas denuded of sperm protecting buffers.

The mechanics of coitus will result in a repeating cycle of compression and release. On release, the restoration of the foam will create a suction on the vaginal areas indicated to pull in displaced vaginal buffers and sperm into the chemically impregnated foam cells.

After ejaculation the foam rubber reservoir is so designed to lie against the critical vaginal wall areas, including the cervix. This action will act to create a uniform chemical-mechanical barrier in depth approximating the buffer denuded vaginal wall and will block any movement of sperm towards the cervical os.

Although the shape and size may widely vary, it has been found most satisfactory to form the device of a 2 to 2½″ square and ⅛″ to ¼″ thick rubber foam overlaying a laminate of lightly vulcanized gum rubber of ⅛″ or less thickness as down to $\frac{1}{32}$″ of an inch, with the foam rubber carrying the spermatocidal material impregnated thereinto.

The preferred laminate is formed by heat sealing or cementing the rubber dam material to the foam rubber or foam plastic material.

Although the laminate may be heat sealed over its entire surface or cemented it is also possible to restrict the sealing to the peripheral edges thereof.

The foam rubber material may be impregnated with a variety of spermatocidal lubricants and other materials of the character above described, which may be dried or subject to being readily released upon moistening.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A conception control device comprising
   (a) a semi-cylindrical cuff member, having
   (b) a front, and
   (c) a rear end,
   (d) said front end being formed into a conically shaped enclosure portion, and
   (e) said rear end being open so that an open trough is provided which extends from said conically shaped enclosure portion to said open rear end;
   (f) the cuff member being further provided with
   (g) a flexible handle means extending across the open rear end so that easy removal of the device from the vagina may be effected,
   (h) said semi-cylindrical cuff member further comprising
   (i) an inner surface layer layer of sheet rubber impermeable material having
   (j) an outer surface layer of foam plastic sheet material,
   (k) said outer surface layer being impregnated with
   (l) a spermatocidal material, whereby
   (m) when the device is inserted into the vagina with the conical shape enclosure portion first,
   (n) the open trough faces the posterior wall of the vagina and
   (o) the outer impregnated surface layer engages the anterior and side walls of the vagina so that
   (p) said outer spermatocidal layer prevents any sperm escaping the inner surface area and entering the area around the cervix.

2. The device of claim 1, said inner layer consisting of a thin sheet about $\frac{1}{32}$″ in thickness and said foam material being about ⅛″ in thickness.

3. The device of claim 1 being formed from a 2″ square of $\frac{5}{32}$″ thick laminate, said foam sheet material being of porous natural rubber latex thicker than the backing material by 20 to 100%.

References Cited by the Examiner

UNITED STATES PATENTS

| 1,052,687 | 2/1913 | Petersen | 128—127 |
| 1,552,878 | 9/1925 | Potter | 128—127 |
| 2,097,033 | 10/1937 | McVittie | 128—127 |
| 3,015,598 | 1/1962 | Jones | 128—127 |

FOREIGN PATENTS 882,877  11/1951  Germany.

RICHARD A. GAUDET, *Primary Examiner.*

D. L. TRULICK, *Assistant Examiner.*